Oct. 11, 1932.  E. N. BERGGREN  1,882,271
SPRAY GUN
Filed Aug. 23, 1930
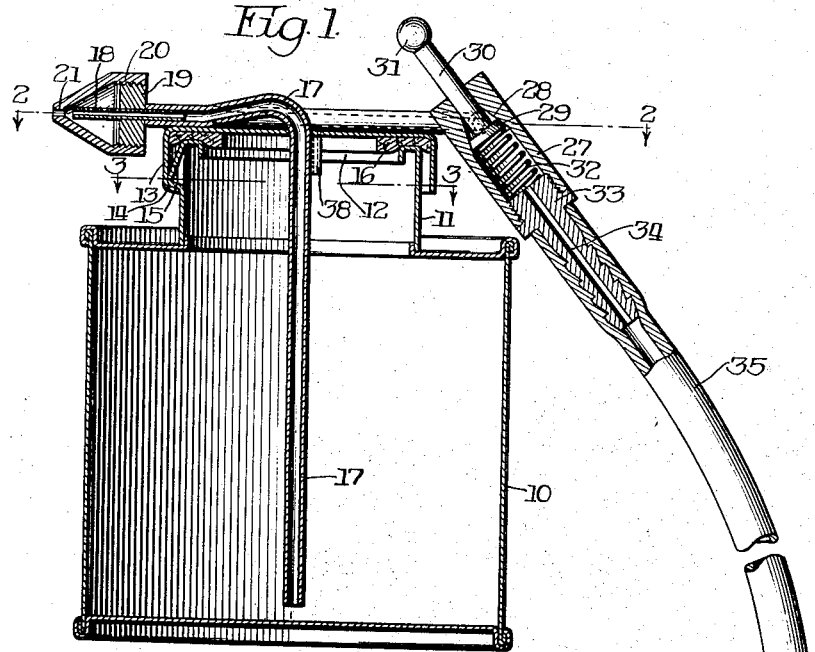
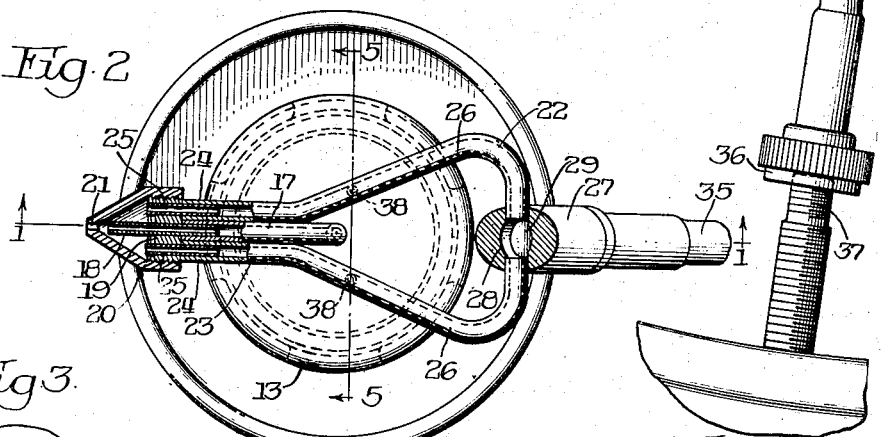
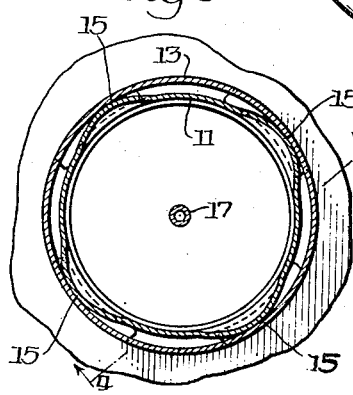
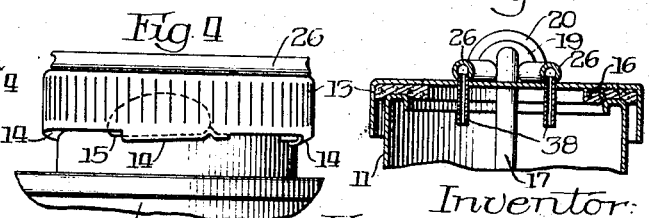
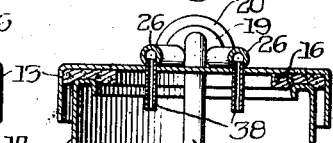
Inventor:
Eric N. Berggren.
By *(signature)*
attys.

Patented Oct. 11, 1932

1,882,271

UNITED STATES PATENT OFFICE

ERIC N. BERGGREN, OF CHICAGO, ILLINOIS,. ASSIGNOR, BY MESNE ASSIGNMENTS, TO CHICAGO CUTTING DIE COMPANY, OF CHICAGO, ILLINOIS, A CORPORATION OF ILLINOIS

SPRAY GUN

Application filed August 23, 1930. Serial No. 477,217.

The invention is related to spray guns or those devices adapted for the application of paints, lacquers, enamels, etc., by atomization as distinguished from the use of brushes for such purpose.

The primary object of the invention is the provision of a device of the character stated designed particularly as an accessory for automobiles, whereby to preserve and maintain the finish thereof, and to be capable of use by persons without experience as painters or mechanics.

The invention further contemplates a spraying device the construction of which is such as to insure a high degree of atomization of the sprayed material, and one which is assembled and organized in such manner as to utilize the air pressure of a spare automobile tire or the like as the source of the pressure fluid employed for the spraying operation. Thus, the invention may be conveniently transported as a part of an automobile repair kit, or utilized about a garage in order to touch up the finish of an automobile should blemishes occur therein, the spare tire of the automobile furnishing a convenient source of air pressure for effecting atomization of the paint, varnish, lacquer, enamel or other material that might be employed in this relation.

Other objects and advantages of the invention will appear as the nature of the improvements is better understood, the invention consisting substantially in the novel construction, combination and arrangement of parts hereinafter fully decsribed, illustrated in the accompanying drawing, and finally pointed out in the appended claims.

While a preferred adaptation of the invention is made the basis of the present disclosure it is to be understood that the invention is capable of embodiment in other forms so that the form herein shown and described is to be taken in an illustrative sense and not as imposing limitation or restriction on the invention.

In the drawing

Fig. 1 is a vertical transverse sectional view of a spray gun constructed in accordance with the present invention, taken generally on the line 1—1, Fig. 2;

Fig. 2 is a sectional plan view, as on the line 2—2, Fig. 1;

Fig. 3 is a similar view, as on the line 3—3, Fig. 1;

Fig. 4 is a fragmentary elevation of the upper end of the container and the cap therefor;

Fig. 5 is a detail sectional view, as on the line 5—5 Fig. 2;

Referring in detail to the accompanying drawing, the numeral 10 designates the container of the material to be sprayed, such as paint, lacquer, enamel, varnish and the like. This container may be the original package in which the material is sold, and in such event the spraying device of the present invention is embodied in appropriate form for application to the container 10 when the cap or cover of the latter is removed. It is immaterial as to the form that may be imparted to the container 10. As illustrated, it is an ordinary cylindrical can having a neck 11 of less diameter than its body portion, said neck terminating in a flanged opening 12 through which access is had to the interior of the container.

Associated with the neck 11, and covering the flanged opening 12 thereof, is a closure cap 13. As illustrated, reference being made particularly to Figs. 1 and 4 of the drawing, the cap 13 is provided with inturned securing flanges 14 arranged at spaced intervals about the lower edge of the skirt of the cap 13. These flanges 14 are inclined, as shown in Fig. 4, to afford a wedging action thereof in their cooperation with a plurality of outwardly extending lugs 15 the lower faces of which are inclined to correspond with the inclination of the flanges 14. The lugs 15 are spaced about the neck 11 so as to be readily engaged by the flanges 14 of the cap 13, and thereby to engage the cap 13 tightly with the neck 11. This is accomplished by positioning the flanges 14 between the spaces intervening the lugs 15, and partially rotating the cap 13 with respect to the neck 11, whereby to wedge the flanges 14 on the lugs 15. Movement of the cap 13 in the opposite direction with respect to the neck 11 releases the flanges 14 from the lugs 15.

To seal the cap 13 in its position upon the neck 11 against passage of the air pressure introduced to the container 10 a gasket 16 of suitable material is arranged between the cap 13 and the edges of the opening 12 of the neck, as more fully set forth at a later point herein.

For atomizing the material as the same is discharged from the container 10 a feed pipe 17 is carried by the closure cap 13, the body thereof being vertically disposed within the container and extending at its inner end to a point adjacent to the bottom of the container. The outer end of the feed pipe 17 is bent into horizontal relationship with the cap 13 and lies along the outside thereof. This feed pipe terminates in a discharge nozzle 18 which passes through the center of a supporting head 19 which is exteriorly screw-threaded for receiving a conical spray nozzle 20 having a discharge opening 21. The nozzle 18 is aligned with the opening 21.

Also carried by the closure cap 13 is a compressed air pipe 22, generally of Y shape, the stem of which provides two parallel members 24 between which the outer end of the feed pipe 17 is disposed, said parallel members 24 being connected to the supporting head 19, and each terminating in a discharge nozzle 25 which passes through the head 19 at one side of the discharge nozzle 18 and communicates with the space at the interior of the conical spray nozzle 20.

The head of the compressed air pipe 22 includes two divergent members 26 which enter opposite sides of a valve body 27 and communicate with the bore thereof, as illustrated in Figs. 1 and 2. One end of the bore of said valve body 27 is tapered, as at 28, and receives a tapered valve 29 carried at the inner end of an operating stem 30 which projects at the exterior of the valve body 27 and terminates in a ball head 31 for the convenient application of pressure to the stem 30 to operate the latter and unseat the valve 29 from the tapered end 28. This tapered end constitutes the seat of the valve 29.

A coil spring 32 is arranged within the valve body 27, one end thereof contacting the valve 29 to hold the same seated in the conical end 28 of the bore, the other end of said spring being in engagement with a nipple 33 having a longitudinal bore 34. The nipple 33 is screw-threaded for engagement with screw-threads arranged at the interior of the valve body 27, thereby providing for detachable engagement of the valve body with said nipple.

Connected to the nipple 33 is a hose 35, which may be of any desired length, the opposite end of the hose 35 having a suitable valve 36 connected thereto, said valve being of the type usually employed with hose for inflating automobile and similar tires. This valve includes the ordinary plunger structure which, when connected with the nipple 37 of an automobile tire valve, as shown in Fig. 1, will unseat the plunger of the tire valve and establish communication between the interior of the tire and the hose 35. Thus, the compressed air of a spare automobile tire becomes readily available as the source of compressed air for supplying the container 10 with the necessary pressure to expel therefrom the paint or similar material which is packed therein.

In order to establish a proper degree of air pressure on the surface of the paint or other material within the container 10, each of the divergent members 26 of the air pipe 22 has a depending feed nozzle 38 extending through the cap 13 and terminating within the neck 11 so as to discharge the compressed air at a point shortly below the top of the cap 13. By this arrangement a sufficient pressure is created on the material within the container 10 to force the same upwardly through the feed pipe 17, thereby combining with the suction exerted on the discharge nozzle 18 by the discharge of the air from the nozzles 25 into the conical spray nozzle 20, and the passage of the air through the opening 21 thereof, to atomize the paint or like material for discharge at the opening 21. In this respect atomization is effected both by pressure within the container 10 and suction at the discharge nozzle 18.

In the use of the herein described spray gun, the valve 36 is connected to the valve of a spare tire, and when the valve 29 is unseated by inward pressure exerted on the stem 30 thereof, the compressed air passes into the pipe 22, a portion thereof being discharged by the feed nozzles 38 into the container 10, and the remainder passing through the members 24 to the discharge nozzles 25 and into the spray nozzle 20. When sufficient pressure has accumulated at the top of the paint or like material within the container 10, and a sufficient degree of suction is being exerted within the nozzle 20, the paint or like material passes upwardly through the feed pipe 17 and is discharged at the nozzle 18. Thereupon it issues through the opening 21 of the nozzle 20 in the form of a spray, and may be projected by the user of the device to the desired point of application. The flow of the atomized paint or like material continues so long as the valve 29 is unseated. When this valve becomes seated, further flow of the air is cut off, and the paint or like material ceases to issue from the nozzle 20. When disconnecting the valve 36 from the tire valve, further escape of air from the spare tire is stopped, and the pressure therein is held for further use.

The invention is designed as an accessory for automobiles, and to supply to the users thereof a convenient spray gun which may form a part of repair kits, either for transportation with the automobile, or for use in a garage. The spare tire of an automobile forms a convenient and readily accessible supply of air under pressure, so that blemishes in the finish of the automobile may be expeditiously and easily removed so as to preserve and maintain the finish of the automobile.

Obviously, the invention is susceptible of embodiment in a complete package or original device in which the paint or like material is packed in the container 10, and the cap 13 forms a closure for such package. The cap 13, however, together with the parts carried thereby, the hose 35, and its valve 36, constitute a unit that is complete, and with original packages of paint or like material having an appropriately formed neck to which the cap 13 may be applied, such packages may be sold independently of the cap 13 and the spraying devices associated therewith, the cap 13 being adaptable to such packages so as to combine therewith and afford a complete spray gun.

While the invention has been described with particular reference to the application of paint and like material, it will be clear that the same may be employed for spraying oils and similar substances, and in that event the invention may serve as a lubricating device conveniently adaptable to the spraying of automobile springs and similar parts.

I claim:

1. A spray gun, comprising a container, a closure for the container, a feed pipe carried by said closure and communicating with the interior of the container, a spray nozzle into which said feed pipe discharges, a pipe for feeding compressed fluid to said spray nozzle and including parallel members arranged to discharge the compressed fluid into said nozzle at opposite sides of said feed pipe, means for supplying compressed fluid to said feeding pipe and a valve for controlling the flow of the compressed fluid from the supplying means to said feeding pipe.

2. A spray gun, comprising a container, a closure for the container, a feed pipe carried by said closure and communicating with the interior of the container, a spray nozzle into which said feed pipe discharges, a pipe for feeding compressed fluid to said spray nozzle and including parallel members arranged to discharge the compressed fluid into said nozzle at opposite sides of said feed pipe, a supply pipe connected to said feeding pipe for supplying compressed fluid to said feeding pipe, a valve for controlling the flow of the compressed fluid from the supply pipe to the feeding pipe, and a valve connection associated with said supply pipe for controlling the admission of fluid under pressure from the source thereof to the supply pipe.

3. A spray gun, comprising a container, a closure for the container, a feed pipe carried by said closure and communicating with the interior of the container, a supporting head associated with said closure and to which said feed pipe is connected, a spray nozzle detachably connected to said supporting head and into which said feed pipe discharges, a pipe for feeding compressed fluid to said spray nozzle and including parallel members arranged to discharge the compressed fluid into said nozzle at opposite sides of said feed pipe, a supply pipe connected to said feeding pipe for supplying compressed fluid to said feeding pipe, a valve for controlling the flow of the compressed fluid from the supply pipe to the feeding pipe, and a valve connection associated with said supply pipe for controlling the admission of fluid under pressure from the source thereof to the supply pipe.

4. A spray gun, comprising a container, a closure for the container, a feed pipe carried by said closure and communicating with the interior of the container, a supporting head associated with said closure and to which said feed pipe is connected, a spray nozzle detachably connected to said supporting head and into which said feed pipe discharges, a pipe for feeding compressed fluid to said spray nozzle and including parallel members arranged to discharge the compressed fluid into said nozzle at opposite sides of said feed pipe, said feeding pipe also including diverging members, a supply pipe connected to said diverging members for supplying compressed fluid to said feeding pipe, and a valve for controlling the flow of the compressed fluid from the supply pipe to the diverging members of the feeding pipe.

5. A spray gun, comprising a container, a closure for the container, a feed pipe carried by said closure and communicating with the interior of the container, a supporting head associated with said closure and to which said feed pipe is connected, a spray nozzle detachably connected to said supporting head and into which said feed pipe discharges, a pipe for feeding compressed fluid to said spray nozzle and including parallel members arranged to discharge the compressed fluid into said nozzle at opposite sides of said feed pipe, said feeding pipe also including diverging members, a supply pipe connected to said diverging members for supplying compressed fluid to said feeding pipe, a valve for controlling the flow of the compressed fluid from the supply pipe to the diverging members of the feeding pipe, and a valve connection associated with said supply pipe for controlling the admission of fluid under pressure from the source thereof to the supply pipe.

6. A spray gun, comprising a container, a closure for the container, a feed pipe carried by said closure and communicating with the interior of the container, a spray nozzle into which said feed pipe discharges, a pipe for feeding compressed fluid to said spray nozzle and including parallel members arranged to discharge the compressed fluid into said nozzle at opposite sides of said feed pipe, feed nozzles carried by the parallel members of said feeding pipe and extending through said closure for discharge within said container, means for supplying compressed fluid to said feeding pipe, and a valve for controlling the flow of the compressed fluid from the supplying means to said feeding pipe.

7. A spray gun, comprising a container, a closure for the container, a feed pipe carried by said closure and communicating with the interior of the container, a spray nozzle into which said feed pipe discharges, a pipe for feeding compressed fluid to said spray nozzle and including parallel members arranged to discharge the compressed fluid into said nozzle at opposite sides of said feed pipe, feed nozzles carried by the parallel members of said feeding pipe and extending through said closure for discharge within said container, means for supplying compressed fluid to said feeding pipe, a valve for controlling the flow of the compressed fluid from the supplying means to said feeding pipe, and a valve connection associated with said supplying means for controlling the admission of fluid under pressure from the source thereof to the supplying means.

8. A spraying device adapted for attachment to a suitable container, comprising a support adapted to serve as a closure for the container, a feed pipe carried by said support, a spray nozzle into which said feed pipe discharges, a pipe for feeding compressed fluid to said spray nozzle and including parallel members arranged to discharge the compressed fluid into said nozzle at opposite sides of said feed pipe, means for supplying compressed fluid to said feeding pipe, and a valve for controlling the flow of the compressed fluid from the supplying means to the feeding pipe.

9. A spraying device adapted for attachment to a suitable container, comprising a support adapted to serve as a closure for the container, a feed pipe carried by said support, a spray nozzle into which said feed pipe discharges, a pipe for feeding compressed fluid to said spray nozzle and including parallel members arranged to discharge the compressed fluid into said nozzle at opposite sides of said feed pipe, means for supplying compressed fluid to said feeding pipe, a valve for controlling the flow of the compressed fluid from the supplying means to the feeding pipe, and a valve connection associated with said fluid supplying means for controlling the admission of fluid under pressure from the source thereof to the fluid supplying means.

In testimony whereof I have hereunto subscribed my name.

ERIC N. BERGGREN.